(12) United States Patent
Cilliere et al.

(10) Patent No.: US 6,669,297 B2
(45) Date of Patent: Dec. 30, 2003

(54) HINGE MECHANISM FOR A VEHICLE SEAT, AND A SEAT FITTED WITH SUCH A MECHANISM

(75) Inventors: François Cilliere, La Selle la Forge (FR); Yann Reubeuze, Landigou (FR)

(73) Assignee: Faurecia Siegeo d'Automobile S.A., Nanterre (FR)

( * ) Notice: Subject to any disclaimer, the term of this patent is extended or adjusted under 35 U.S.C. 154(b) by 0 days.

(21) Appl. No.: 10/328,080

(22) Filed: Dec. 23, 2002

(65) Prior Publication Data

US 2003/0184143 A1 Oct. 2, 2003

(30) Foreign Application Priority Data

Dec. 24, 2001 (FR) .............................. 01 16825

(51) Int. Cl.⁷ .............................. B60N 2/20; B60N 2/22
(52) U.S. Cl. .................. 297/367; 297/366; 297/378.12
(58) Field of Search ................. 297/366, 367, 297/368, 369, 378.12

(56) References Cited

U.S. PATENT DOCUMENTS

| | | | |
|---|---|---|---|
| 4,082,352 A | | 4/1978 | Bales et al. |
| 5,779,313 A | | 7/1998 | Rohee |
| 6,092,874 A | * | 7/2000 | Kojima et al. ............... 297/367 |
| 6,328,383 B2 | * | 12/2001 | Rohee et al. ............... 297/367 |
| 6,390,557 B1 | | 5/2002 | Asano |
| 6,520,583 B1 | * | 2/2003 | Bonk .......................... 297/367 |
| 6,554,361 B2 | * | 4/2003 | Reubeuze et al. ........... 297/367 |
| 6,561,585 B2 | * | 5/2003 | Cilliere et al. .............. 297/367 |
| 6,575,278 B1 | * | 6/2003 | Schumann et al. ......... 297/367 |

FOREIGN PATENT DOCUMENTS

| | | |
|---|---|---|
| DE | 14 80 645 | 5/1969 |
| EP | 0 770 514 A1 | 5/1997 |
| EP | 0 967 110 A2 | 12/1999 |

OTHER PUBLICATIONS

International Search Report; French Search Report dated Sep. 12, 2002.

* cited by examiner

Primary Examiner—Anthony D. Barfield
(74) Attorney, Agent, or Firm—Marshall, Gerstein & Borun LLP (57) ABSTRACT

A hinge mechanism for a vehicle seat for adjusting the inclination of the seat back relative to the seat proper. The mechanism comprises:

two rigid strength members mounted to pivot relative to each other, one of the strength members being a moving member secured to the seat back and the other being a fixed member secured to the seat proper;

at least two slugs adapted to be moved between a position in which they prevent the strength members from moving relative to each other, and a retracted position; and a circular ramp which pivots with the seat back and which can keep a control slug in its retracted position, with the angular sum of the locking angular sector and the unlocking angular sector of the ramp occupying at least 120° about the pivot axis.

The invention also provides a seat fitted with such a mechanism.

11 Claims, 4 Drawing Sheets

HINGE MECHANISM FOR A VEHICLE SEAT, AND A SEAT FITTED WITH SUCH A MECHANISM

FIELD OF THE INVENTION

The present invention relates to hinge mechanisms for vehicle seats, and to seats fitted with such mechanisms.

More particularly, the invention relates to a hinge mechanism for a vehicle seat to adjust the inclination of a seat back relative to a seat proper about a pivot axis, the mechanism comprising:

first and second rigid strength members mounted to pivot relative to each other about the pivot axis, one of these strength members being for connection to the seat back and the other one for connection to the seat proper;

a set of teeth secured to the first strength member and forming at least one circular arc centered on the pivot axis;

at least two toothed slugs mounted on the second strength member and movable at least radially relative to the pivot axis between a locking position in which each slug co-operates with the set of teeth to prevent the first and second strength members moving relative to each other, and a retracted position in which each slug does not interfere with the set of teeth;

a control device mounted to pivot about the pivot axis and adapted to provide positive control over the displacement of each slug from its locked position to its retracted position, and vice versa; and an at least partially-circular stepped ramp secured to the first strength member, said ramp having an unlocking angular sector for co-operating with a control slug and for holding the control slug in its retracted position, and a locking angular sector in which the ramp does not interfere with the control slug.

BACKGROUND OF THE INVENTION

With hinge mechanisms of this type, the seat back cannot pivot while the mechanism is locked, i.e. so long as the control device has not moved the slugs into their retracted position. However, once the slugs have been moved into the retracted position by means of the control device, then the ramp enables the hinge mechanism to be maintained in the unlocked state, even after the control member has been released, during certain maneuvers of the seat back such as being folded down forwards temporarily in order to give access to the back seat of the vehicle.

Document EP-B-0 770 514 describes an example of such a mechanism, which mechanism gives full satisfaction.

That mechanism has three slugs that are regularly distributed around the pivot axis in order to balance the hinge mechanism, in particular in reaction to radial forces exerted on the pivot axis, and the ramp co-operates with each slug in order to maintain them in the retracted position. The ramp thus has three locking angular sectors and three unlocking angular sectors. The sum of the locking and unlocking angular sectors for a single slug is thus equal to 120° and the tilting range of the seat back cannot exceed that value.

OBJECTS AND SUMMARY OF THE INVENTION

A particular object of the present invention is to further increase the tilting range of the seat back, for example in order to tilt the seat back forwards in order to gain access to the back seat, and backwards into a reclining or bunk position.

To this end, according to the invention, in a hinge mechanism of the kind in question, the angular sum of the locking and unlocking angular sectors, for the control slug able to co-operate with the ramp, extends over more than 120° about the pivot axis.

By means of these dispositions, the seat back can pivot over at least 120°, for example, between an in-use position in which it extends substantially vertically and a forward position facilitating access to the back seats of the vehicle and/or between said in-use position and a bunk or reclining position in which the seat back extends towards the back of the vehicle substantially parallel to the seat proper and/or between the bunk position and the position that facilitates access to the back seat.

In preferred embodiments of the invention, recourse may optionally also be made to one or more of the following dispositions:

the mechanism has only one control slug, each other slug being an auxiliary slug shaped so as not to co-operate with the ramp;

the locking angular sector extends about the pivot axis over 30° to 90°, with the unlocking angular sector being complementary to the locking angular sector to make up 360°;

the locking angular sector extends about the pivot axis substantially over 60°, the unlocking angular sector being complementary to the locking angular sector to make up 360°;

the control slug has a peg extending parallel to the pivot axis, adapted to co-operate with the ramp when the unlocking angular sector is in register with the control slug;

the control device comprises a rotary cam urged resiliently between a rest position in which it holds each slug in co-operation with the set of teeth, and an active position in which it does not co-operate with the slugs;

the control device has a mask which is secured to the cam and which overlies each slug at least in part, said mask having cutouts adapted to co-operate with projecting pegs formed on one surface of each slug situated facing said mask, so as to move the slugs simultaneously towards their retracted positions when the cam is moved towards its active position;

the control slug for co-operating with the ramp is adapted to lock the cam in its active position while it is being held by the ramp, when in the retracted position;

the mechanism has two auxiliary slugs placed at substantially 120° to the control slug, and the second strength member has two reaction bearings projecting from its face facing the slugs, each of the reaction bearings being situated respectively between two slugs and being adapted to co-operate in sliding contact with the cam via a surface extending over a circular arc about the pivot axis; and the cam has an abutment extending between two slugs and adapted to block displacement of the control device in an angular sector defined by two counter-abutments projecting from the surface of the second strength member facing the cam and corresponding respectively to the rest position and to the active position of the cam.

In another aspect, the invention provides a vehicle seat including a seat back pivotally mounted on a seat proper by means of at least one hinge mechanism as defined above.

BRIEF DESCRIPTION OF THE DRAWINGS

Other aspects, objects, and advantages of the invention appear on reading the following description of an embodiment thereof.

The invention will also be better understood with the help of the drawings, in which.

MORE DETAILED DESCRIPTION

In the various figures, the same references are used to designate elements that are identical or similar.

Figure 1:
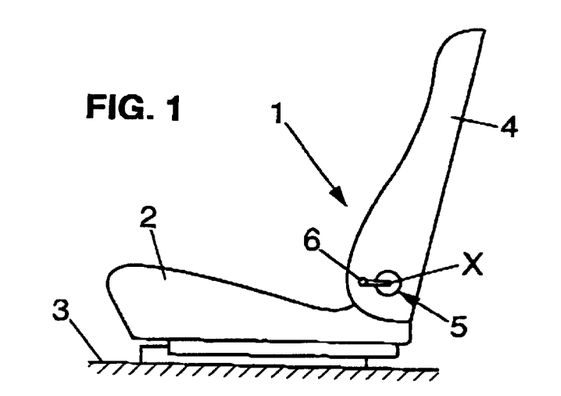
FIG. 1 is a diagrammatic view of a vehicle seat including a hinge mechanism of the invention.

As shown diagrammatically in FIG. 1, the invention relates to a vehicle seat 1, in particular a front seat for a motor vehicle, the seat comprising:

firstly a seat proper 2 mounted on the floor 3 of the vehicle; and secondly a seat back 4 mounted to pivot on the seat proper 2 about a horizontal transverse pivot axis X by means of a hinge mechanism 5 controlled by a control lever 6 or the like.

Figure 2:
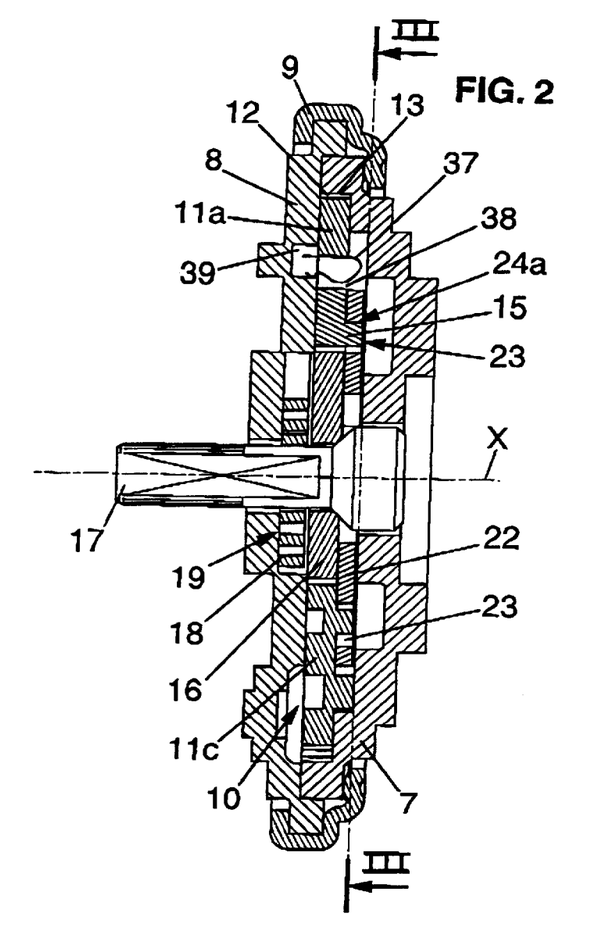
FIG. 2 is an axial section view on a broken line II—II marked in FIG. 4, showing an embodiment of the hinge mechanism fitted to the seat of FIG. 1.
Figure 3:
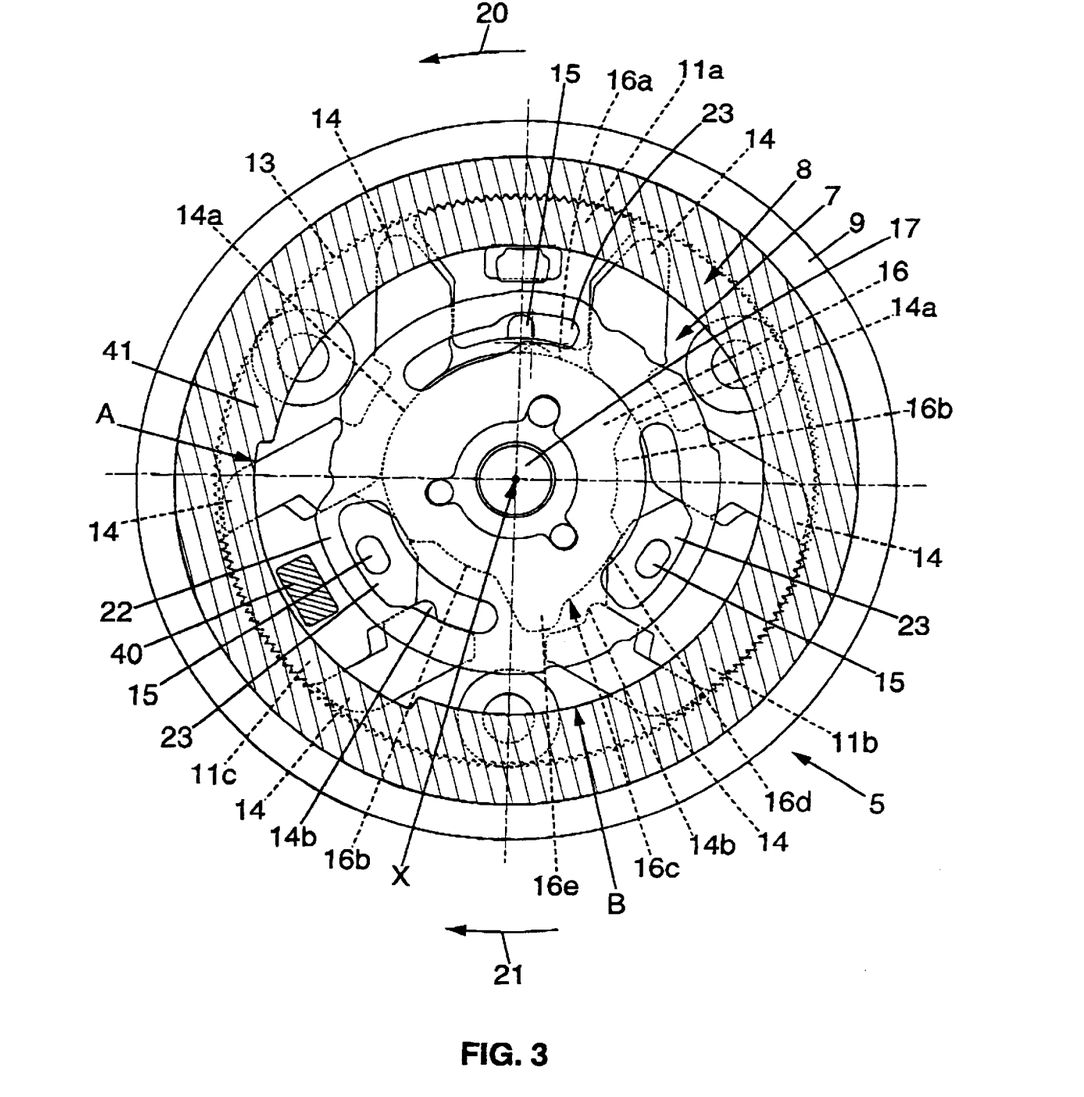
FIG. 3 is a section view of the FIG. 2 embodiment on line III—III in FIG. 2, showing the control device of the hinge mechanism of the invention in its engaged position.
Figure 4:
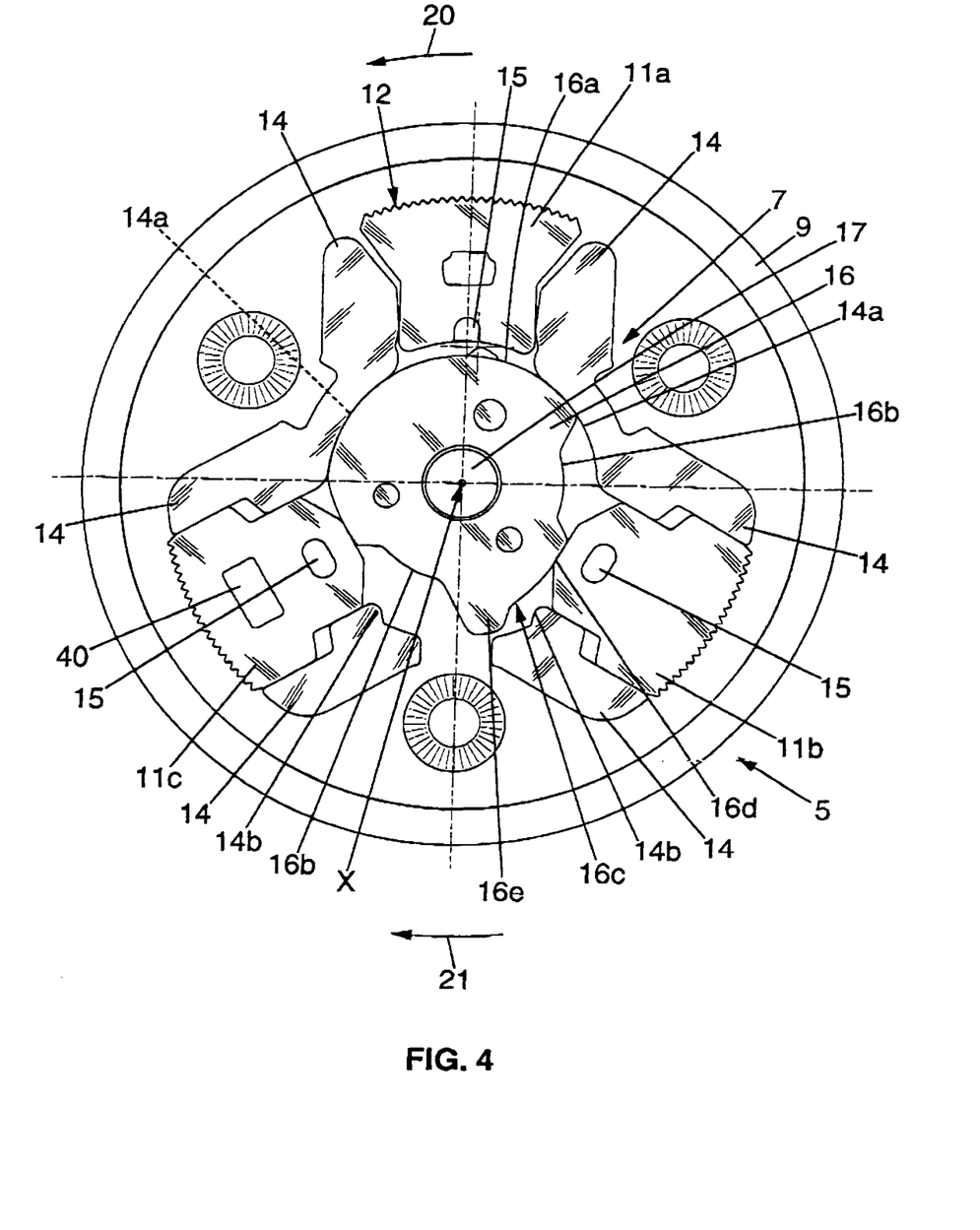
FIG. 4 is a diagrammatic elevation view of the hinge mechanism shown in FIGS. 2 and 3 with the moving cheekplate and the mask removed.

As shown in FIGS. 2, 3, and 4, the hinge mechanism 5 comprises:

a first rigid strength member or cheekplate 7 made of metal, which cheekplate is a moving plate secured to the seat back 4;

a second rigid strength member or cheekplate 8 made of metal, which cheekplate is stationary and is secured to the seat proper 2;

a metal ring 9 crimped around the periphery of the moving and stationary cheekplates 7 and 8 and co-operating with them to define a closed circular housing; and a locking device 10 which is contained in said housing and which is adapted to prevent the moving cheekplate 7 from moving relative to the fixed cheekplate 8 so long as the lever 6 is not actuated.

By way of example, the locking device 10 may comprise two auxiliary slugs 11a and 11b together with a control slug 11c. These three slugs 11a, 11b, and 11c are made of metal, they are distributed at substantially 120° from one another around the pivot axis X, and each of them presents an outwardly-directed set of teeth 12 adapted to engage with a circular inwardly-directed set of teeth 13 formed in the moving cheekplate 7 and centered on the pivot axis X.

Each of these slugs 11a, 11b, and 11c is mounted to slide radially in a channel that is defined between two rigid guides 14 constituted by half-cutouts or stampings made in the fixed cheekplate 8, in its face facing towards the slugs 11a, 11b, and 11c.

The slugs 11a, 11b, and 11c can thus be moved between:
firstly a locking position in which the outwardly-directed set of teeth 12 of each of the slugs 11a, 11b, and 11c engages with the inwardly-directed set of teeth 13 of the moving cheekplate 7 to lock the hinge mechanism 5; and secondly a retracted position in which the slugs 11a, 11b, and 11c do not co-operate with the inwardly-directed set of teeth 13 of the moving cheekplate 7.

Each slug 11a, 11b, and 11c also has at least one peg 15 which projects axially towards the moving cheekplate 7.

The locking device 10 has a control device comprising a metal cam 16 secured to a control shaft 17, itself secured to the lever 6, the cam 16 controlling sliding of the slugs 11a, 11b, and 11c.

This control device is mounted to turn about the pivot axis X between an engaged position and a disengaged position. It is adapted to control the displacement of the slugs 11a, 11b, and 11c positively from their locked position (engaged position of the control device) to their unlocked position (disengaged position of the control device), and vice versa.

The cam 16 possesses a peripheral edge comprising:

a large-radius sector 16a constituting a circular arc of constant radius, extending over about 180° around the pivot axis X;

two small-radius sectors 16b extending over about 60° on either side of the large-radius sector 16a; and an intermediate sector 16c extending between the two small-radius sectors 16b, this intermediate sector 16c itself comprising a thrust portion 16d occupying about 40° from the small-radius sector 16b that is closer to the auxiliary slug 11b, of radius identical to that of the large-radius sector 16a, and an abutment 16e extending radially between the auxiliary slug 11b and the control slug 11c away from the pivot axis X over a distance that is greater than the radius of the large-radius sector 16a.

The large-radius sector 16a co-operates by sliding contact with two reaction bearings 14a formed in the face of the stationary cheekplate 8 facing the slugs 11b and 11c. Each of these reaction bearings 14a is situated respectively between a guide 14 of the auxiliary slug 11a and a guide 14 of the control slug 11c, or between a guide 14 of the auxiliary slug 11a and a guide 14 of the auxiliary slug 11b, as the case may be. These reaction bearings 14a serve to balance the hinge mechanism 5, in particular in reaction to radial forces exerted by the control shaft 17.

The small-radius sectors 16b are of a radius such that, when they are in register with the auxiliary slug 11b and the control slug 11c, they form setbacks in which the auxiliary slug 11b and the control slug 11c can respectively return towards the pivot axis X in order to take up their retracted positions.

A portion of the large-radius sector 16a and the thrust portion 16d are designed to co-operate respectively with the control slug 11c and with the auxiliary slug 11b so as to hold them in the locking position.

The abutment 16e is adapted to prevent the cam 16 from moving between the engaged position and the disengaged position of the control device in an angular sector defined by two counter-abutments 14b. These two counter-abutments 14b project from the face of the stationary cheekplate 8. They are formed as semi-cutouts or by stamping and they lie between a guide 14 for the auxiliary slug 11b and a guide 14 for the control slug 11c.

In addition, a spring 18 is mounted, e.g. in a cup 19 stamped in the stationary cheekplate 8, so as to urge the control shaft 17 and the cam 16 in the clockwise direction 20 towards a rest position in which the cam 16 places the slugs 11a, 11b, and 11c in their locking positions, the cam 16 being capable of pivoting in the opposite angular direction 21 under drive from the control lever 6, thus enabling the slugs 11a, 11b, and 11c to slide towards their retracted positions, thereby unlocking the hinge mechanism 5.

Furthermore, the control device also includes a rigid metal mask 22 lying in a radial plane and constrained to return with the cam 16, extending between said cam 16 and the moving cheekplate 7 so as to overlap the slugs 11a, 11b, and 11c in part. The mask 22 has three cutouts 23 receiving the pegs 15 on the slugs 11a, 11b, and 11c, each of these pegs 15 co-operating with a first camming edge 24a defined by the corresponding cutout 23 radially on the outside and shaped to move the corresponding peg 15 radially inwards when the cam 16 turns in the direction 21, and a second camming edge 24b defining the corresponding cutout 23 radially on the inside and shaped to move the corresponding peg radially outwards when the cam 16 turns in the direction 20, and to hold the slug corresponding to the peg in the active position.

The auxiliary slug 11a lies between two guides 14 that provide radial clearance.

In contrast, the auxiliary slug 11b and the control slug 11c lie between respective pairs of guides 14 that provide substantially no clearance in the circumferential direction.

The auxiliary slug 11a has a rear portion 25 provided with two lateral edges 26a and a transverse edge 26b. The two lateral edges 26a extend parallel on either side of the radial direction of symmetry R of the auxiliary slug 11a. These lateral edges 26a come mutually into contact with corresponding edges 27a belonging to the two adjacent guides 14. Each of the edges 27a preferably forms two plane faces 28 meeting at a point and forming between them an angle close to about 170°, so as to converge towards a vertex 29 in contact with the auxiliary slug 11a.

The transverse edge 26b presents a concave side extending substantially between the two lateral edges 26a and adapted to co-operate in sliding with the cam 16.

Each edge 27a also has a swelling 30. Each swelling 30 is in alignment in a direction parallel to the radial direction R with the vertex 29 of the corresponding edge 27a so as to guide the auxiliary slug 11a parallel to the radial direction R by points contact between each of the two vertices 29 and the two swellings 30 situated facing them on the edges 27a.

Furthermore, the auxiliary slug 11a has a front portion 31a forming an enlarged head diverging radially outwards. This front portion 31a has two diverging edges 32a placed facing corresponding thrust edges 33a formed by the two adjacent guides 14 and which likewise diverge radially outwards (each forming an angle lying in the range 30° to 60°, for example, relative to the direction R). The diverging edges 32a are engaged with a certain amount of clearance between the two bearing edges 33a belonging to the two guides 14 adjacent to the auxiliary slug 11a.

Together with the outwardly-directed set of teeth 12 on the auxiliary slug 11a, the diverging edges 32a form wedges 35 that project laterally relative to the rear portion 25, each of these wedges 35 being engaged in empty space 36 that is also wedge-shaped and defined by the corresponding bearing edge 33a and the inwardly-directed set of teeth 13 of the moving cheekplate 7.

By means of these dispositions, the auxiliary slug 11a can pivot a little about an axis parallel to the pivot axis X so that the outwardly-directed set of teeth 12 of said auxiliary slug 11a can move a certain distance in the circumferential direction relative to the stationary cheekplate 8.

This angular displacement is limited:

by the plane faces 28 of each edge 27a coming into abutment against the corresponding lateral edge 26a; and by the diverging edges 32a of the front portion 31a coming into abutment against the bearing edges 33a.

The auxiliary slug 11a is also urged resiliently towards its active position, e.g. by means of a blade spring 37 forming a spring blade that is folded substantially into a U-shape, received in a recess 38 formed in the auxiliary slug 11a, and penetrating into a housing 39 formed in the stationary cheekplate 8.

In normal use of the hinge mechanism 5, the auxiliary slug 11a produces substantially no effect.

In contrast, in the event of the seat back 4 of the seat 1 being subjected to a particularly high level of pivoting torque (e.g. greater than 100 decanewton-meters (daN.m) as a result in particular of the vehicle suffering an accident, then the auxiliary slug 11b and the control slug 11c can be caused to deform their guides 14 to some extent so that the moving cheekplate 7 begins to pivot in angular direction 20 relative to the stationary cheekplate 8, e.g. through an angle of less than 2°.

One of the wedges 35 of the auxiliary slug 11a then moves through the small circumferential clearance that used to separate it from the corresponding bearing edge 33a, and as a result the auxiliary slug 11a is thrust hard against the inwardly-directed set of teeth 13 of the moving cheekplate 7 by the wedging effect, thereby considerably increasing the mechanical strength of the hinge mechanism 5.

It should be observed that the auxiliary slug 11a remains in its final position after the vehicle has suffered an accident: if the accident has been violent, then the auxiliary slug 11a keeps the seat back 4 locked in position. This auxiliary slug 11a thus constitutes an indicator of the amount of damage to which the seat 1 has been subjected, thereby informing the user and/or vehicle maintenance personnel that it is necessary to replace the seat 1 in order to guarantee passenger safety.

It should also be observed that the plastic deformation of the guides 14 by means of the slugs 11a, 11b, and 11c serves to absorb a non-negligible amount of mechanical energy in the event of the vehicle suffering an impact, thereby contributing to damping the impact for the passenger of the seat 1.

The operation of the hinge mechanism 5 would be the same if the torque to which the moving cheekplate 7 is subjected where in the angular direction 21.

The auxiliary slug 11b and the control slug 11c have a respective rear portions 25 each provided with two lateral edges 26a and a transverse edge 26c. As for the auxiliary slug 11a, the two lateral edges 26a extend parallel on either side of the radial direction of symmetry of the auxiliary slug 11b or of the control slug 11c.

The transverse edge 26c has a concave portion connected to the lateral edges 26c via chamfered flats. This concave portion is adapted to co-operate in sliding with the cam 16.

In addition, the auxiliary slug 11b and the control slug 11c have respective front portions 31b forming enlarged heads. On either side of the outwardly-directed set of teeth 12 on the auxiliary slug 11b or the control slug 11c, this front portion 11b has two parallel edges 32b placed facing corresponding edges 33b that are likewise parallel and formed by two adjacent guides 14.

The edges 26a and 32b are in mutual contact with the corresponding edges 27b and 33b belonging to the two adjacent guides 14. The two edges 27b and 33b extend parallel to the edges 26a and 32b with practically no clearance (only the amount of clearance needed to allow the slugs 11b and 11c to move between their respective guides 14 parallel to the radial directions of symmetry of said slugs 11b and 11c).

The auxiliary slug 11b and the control slug 11c differ essentially in that the control slug 11c is the only slug to have another peg 40 extending parallel to the pivot axis X and projecting from the face of the control slug 11c that faces the moving cheekplate 7.

Figure 5:
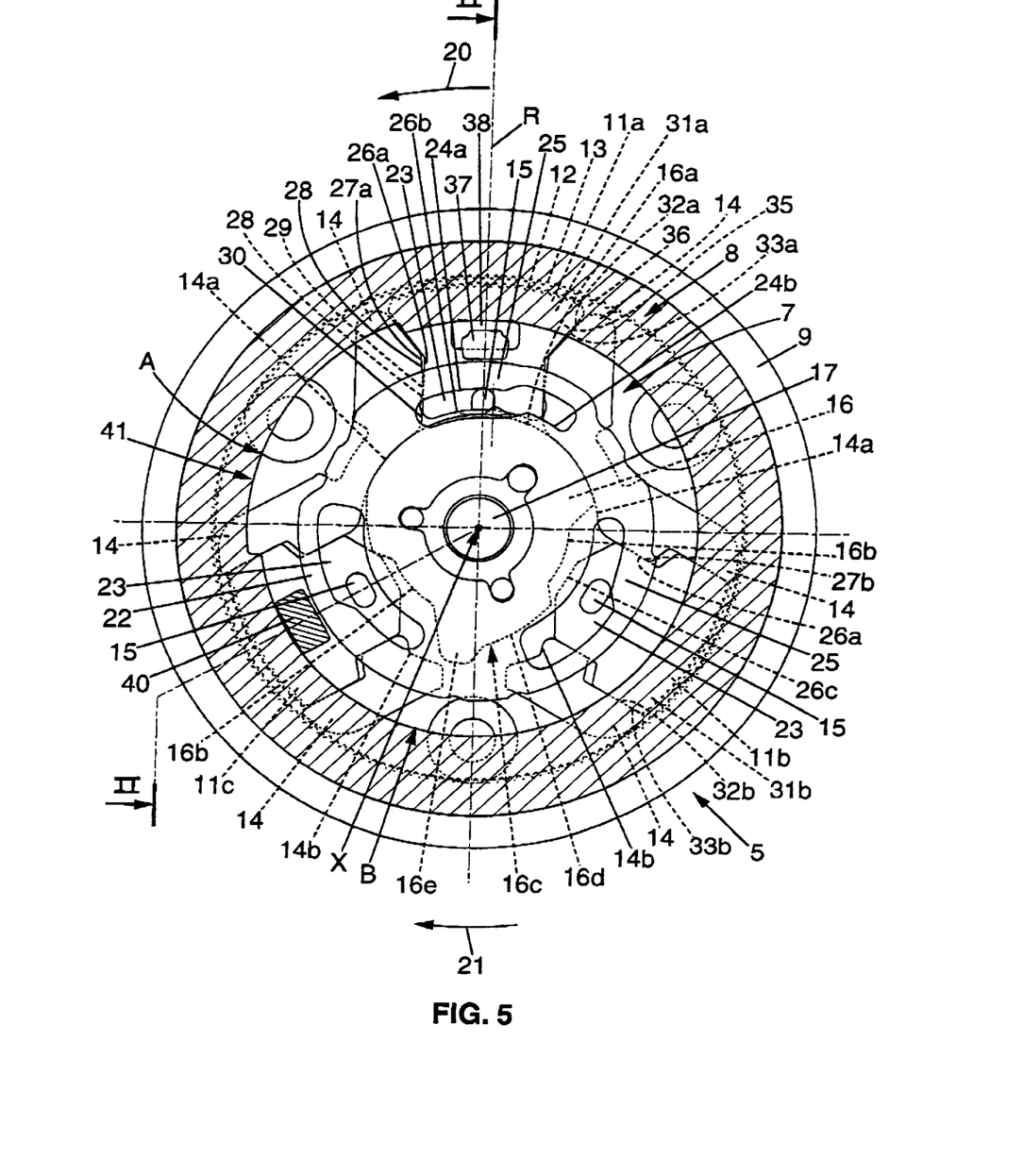
FIG. 5 is another view of the embodiment shown in FIGS. 2 and 3, in section on line III—III of FIG. 2, when the control device of the hinge mechanism of the invention is in its disengaged position.

The hinge mechanism 5 also includes a stepped ramp 41 secured to the moving cheekplate 7. This ramp 41 has two circularly arcuate angular sectors A and B of different diameters centered on the pivot axis. The diameters of these circular arcs are determined in such a manner that:

when the larger-diameter angular sector A is in register with the peg 40, then the control slug 11c can travel along its entire radial stroke; and on the contrary, when the smaller-diameter angular sector B is in register with the peg 40, after the ramp 41 has been turned through a sufficient angle about the pivot axis X in the direction 21, then the peg 40 is locked radially by the ramp 41 in its disengaged position closer to the pivot axis X, corresponding to the hinge mechanism 5 being unlocked.

In the embodiment described herein, the angular sector A extends over about 60° while the angular sector B extends in complementary manner over about 300°. However the ramp 41 can co-operate only with the control slug 11c.

This disposition makes it possible to maintain the control slug 11c in its disengaged or unlocking position even if the user lets go the lever 6, so long as the seat back 4 is in an inclined position such that the angular sector B remains radially in register with the peg 40. Such an inclined position of the seat back 4 corresponds to a position in which it is desirable for the hinge mechanism 5 to remain unlocked. By way of example, this position corresponds to the seat back 4 being folded down forwards to facilitate access to the back seats of the vehicle, as is common practice for vehicles having only two side doors, and also in the event of the seat back 4 being put into a bunk position.

The radial blocking of the control slug 11c caused by co-operation between the ramp 41 and the peg 40 is naturally automatically eliminated as soon as the angular sector A replaces the angular sector B in its position radially in register with the peg 40: the peg 40 can then travel along its entire radial stroke, thus enabling the control slug 11c again to lock the angular position of the seat back 4.

What is claimed is:

1. A hinge mechanism for a vehicle seat to adjust the inclination of a seat back relative to a seat proper about a pivot axis, the mechanism comprising:

first and second rigid strength members mounted to pivot relative to each other about the pivot axis, one of these strength members being for connection to the seat back and the other one for connection to the seat proper;

a set of teeth secured to the first strength member and forming at least one circular arc centered on the pivot axis;

at least two toothed slugs mounted on the second strength member and movable at least radially relative to the pivot axis between a locking position in which each slug co-operates with the set of teeth to prevent the first and second strength members moving relative to each other, and a retracted position in which each slug does not interfere with the set of teeth;

a control device mounted to pivot about the pivot axis and adapted to provide positive control over the displacement of each slug from its locked position to its retracted position, and vice versa; and an at least partially-circular stepped ramp secured to the first strength member, said ramp having an unlocking angular sector for co-operating with a control slug and for holding the control slug in its retracted position, and a locking angular sector in which the ramp does not interfere with the control slug;

wherein the angular sum of the locking and unlocking angular sectors, for the control slug able to co-operate with the ramp, extends over more than 120° about the pivot axis.

2. A mechanism according to claim 1, having only one control slug, each other slug being an auxiliary slug shaped so that it does not co-operate with the ramp.

3. A mechanism according to claim 2, in which the control slug has a peg extending parallel to the pivot axis when the unlocking angular sector is in register with the control slug.

4. A mechanism according to claim 1, in which the control device comprises a rotary cam urged resiliently between a rest position in which it holds each slug in co-operation with the set of teeth, and an active position in which it does not co-operate with the slugs.

5. A mechanism according to claim 4, in which the control device has a mask which is secured to the cam and which overlies each slug at least in part, said mask having cutouts adapted to co-operate with projecting pegs formed on one surface of each slug situated facing said mask, so as to move the slugs simultaneously towards their retracted positions when the cam is moved towards its active position.

6. A mechanism according to claim 4, having only one control slug for co-operating with the ramp and adapted to block the cam in its active position while the slug is held in its retracted position by the ramp.

7. A mechanism according to claim 6, in which two auxiliary slugs are disposed substantially at 120° from the control slug, and in which the second strength member has two reaction bearings projecting from its face facing the slugs, each of the reaction bearings being situated respectively between two slugs and being adapted to co-operate in sliding contact with the cam via a surface extending over a circular arc about the pivot axis.

8. A mechanism according to claim 4, in which the cam has an abutment extending between two slugs and adapted to block displacement of the control device in an angular sector defined by two counter-abutments projecting from the surface of the second strength member facing the cam and corresponding respectively to the rest position and to the active position of the cam.

9. A mechanism according to claim 1, in which the locking angular sector extends about the pivot axis over 30° to 90°, with the unlocking angular sector being complementary to the locking angular sector to make up 360°.

10. A mechanism according to claim 1, in which the locking angular sector extends about the pivot axis substantially over 60°, the unlocking angular sector being complementary to the locking angular sector to make up 360°.

11. A vehicle seat comprising a seat back pivotally mounted on a seat proper by means of at least one hinge mechanism according to claim 1.

* * * * *

UNITED STATES PATENT AND TRADEMARK OFFICE
CERTIFICATE OF CORRECTION

PATENT NO. : 6,669,297 B2
DATED : December 30, 2003
INVENTOR(S) : Francois Cilliere et al.

It is certified that error appears in the above-identified patent and that said Letters Patent is hereby corrected as shown below:

Title page,
Item [73], Assignee, please delete "Siegeo" and insert -- Siéges --.

Signed and Sealed this

Twenty-seventh Day of April, 2004

JON W. DUDAS
*Acting Director of the United States Patent and Trademark Office*

(12) EX PARTE REEXAMINATION CERTIFICATE (5545th)

United States Patent
Cilliere et al.

(10) Number: US 6,669,297 C1
(45) Certificate Issued: Oct. 3, 2006

(54) HINGE MECHANISM FOR A VEHICLE SEAT, AND A SEAT FITTED WITH SUCH A MECHANISM

(75) Inventors: François Cilliere, La Selle la Forge (FR); Yann Reubeuze, Landigou (FR)

(73) Assignee: Faurecia Siéges d'Automobile S.A., Nanterre (FR)

Reexamination Request:
No. 90/007,048, May 24, 2004

Reexamination Certificate for:
Patent No.: 6,669,297
Issued: Dec. 30, 2003
Appl. No.: 10/328,080
Filed: Dec. 23, 2002

Certificate of Correction issued Apr. 27, 2004.

(30) Foreign Application Priority Data

Dec. 24, 2001 (FR) .............................. 01 16825

(51) Int. Cl.
*B60N 2/20* (2006.01)
*B60N 2/22* (2006.01)

(52) U.S. Cl. .................... 297/367; 297/366; 297/378.12
(58) Field of Classification Search .......... 297/366–369
See application file for complete search history.

(56) References Cited

U.S. PATENT DOCUMENTS 6,669,297 B1 * 12/2003 Cilliere et al. .............. 297/367

2002/0043852 A1 * 4/2002 Uramichi .................... 297/366

FOREIGN PATENT DOCUMENTS

| EP | 1197377 A2 | * | 4/2002 |
| JP | 2001017259 |   | 1/2001 |
| JP | 2002119349 | * | 4/2002 |
| JP | 2003000379 |   | 1/2003 |

* cited by examiner

*Primary Examiner*—Matthew C. Graham (57) ABSTRACT

A hinge mechanism for a vehicle seat for adjusting the inclination of the seat back relative to the seat proper. The mechanism comprises:

two rigid strength members mounted to pivot relative to each other, one of the strength members being a moving member secured to the seat back and the other being a fixed member secured to the seat proper;

at least two slugs adapted to be moved between a position in which they prevent the strength members from moving relative to each other, and a retracted position, and a circular ramp which pivots with the seat back and which can keep a control slug in its retracted position, with the angular sum of the locking angular sector and the unlocking angular sector of the ramp occupying at least 120° about the pivot axis.

The invention also provides a seat fitted with such a mechanism.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *